United States Patent Office 3,572,263
Patented Mar. 23, 1971

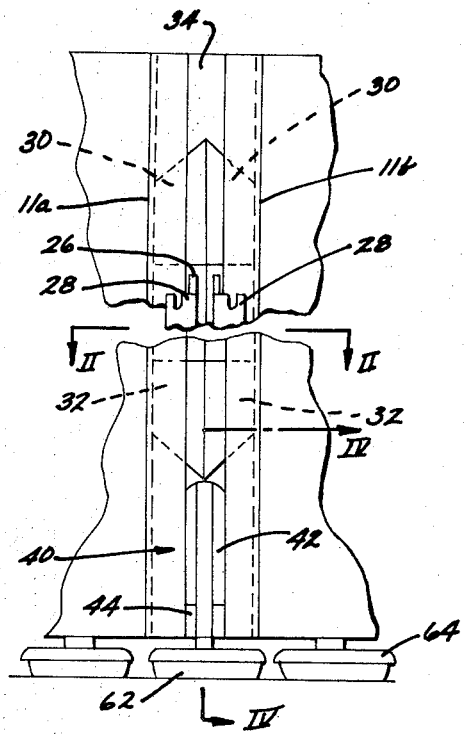
FIG. 1.
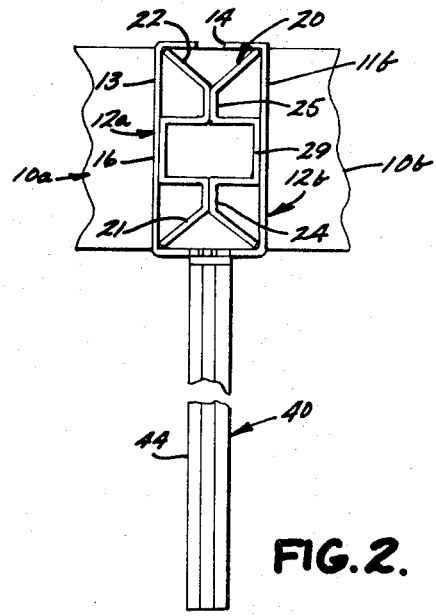
FIG. 2.
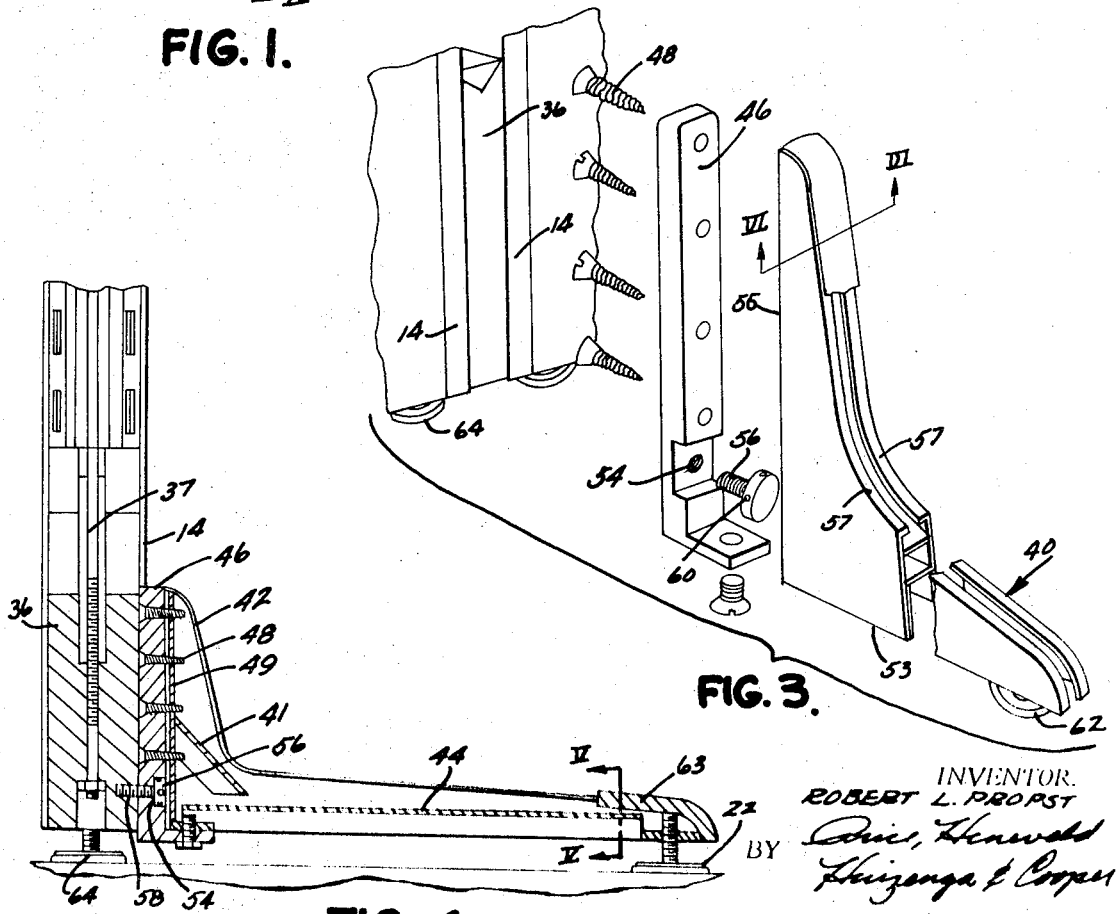
FIG. 3.
FIG. 4.
INVENTOR.
ROBERT L. PROPST
BY
ATTORNEYS

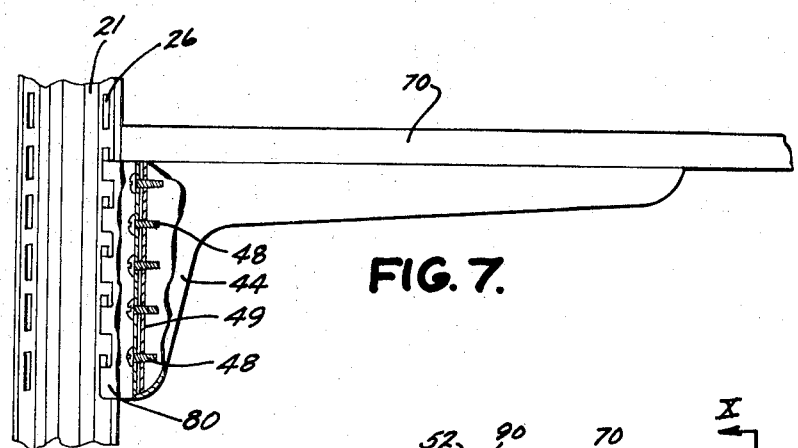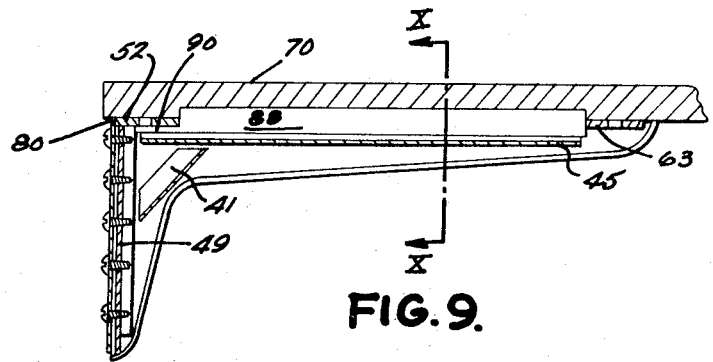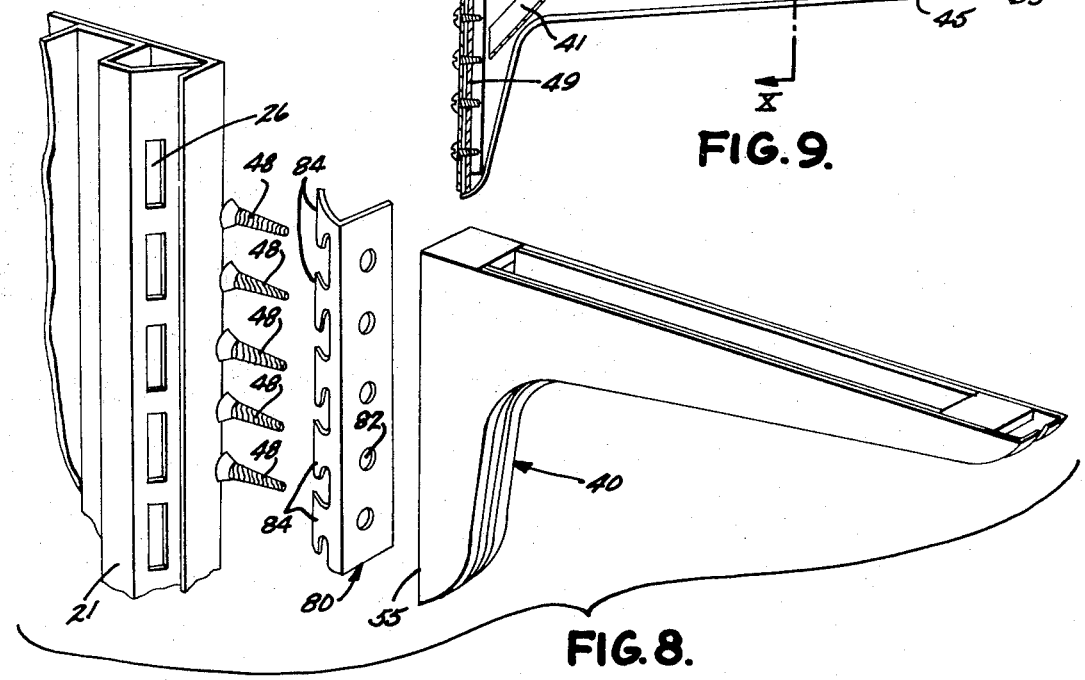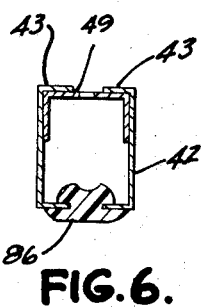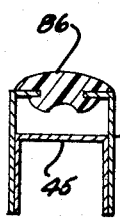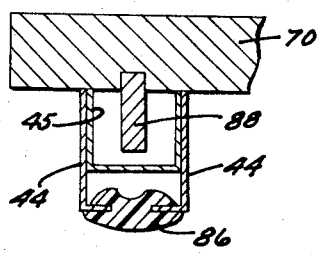

3,572,263
FURNITURE CONSTRUCTION
Robert L. Propst, Ann Arbor, Mich., assignor to
Herman Miller, Inc., Zeeland, Mich.
Filed June 13, 1968, Ser. No. 736,857
Int. Cl. A47b 5/02
U.S. Cl. 108—152                             3 Claims

ABSTRACT OF THE DISCLOSURE

This disclosure relates to a furniture construction having a plurality of vertically disposed space divider components which are rigidly secured together by connector post structures. The divider has a stabilizer means in the form of brackets at the floor to counterbalance modular units which can be supported by the post structures. The bracket member is attached to the post structure through a supporting bar and a screw, the head of which screw is positioned in a slot in the supporting bar between the post structure and the bracket member. Means are provided on the radial edges of the screw for turning the screw to attach the bracket construction to the bottom portion of the connector post structure. The same bracket is interchangeably useable as a support for cantilevered furniture components mounted on the space divider.

---

This invention relates to furniture construction. In one of its aspects it relates to a furniture construction in which a plurality of vertically spaced panels are rigidly connected by a connector structure to which modular units can be attached, wherein the modular units are counterbalanced at the floor by a bracket member which is rigidly attached to the connector structure and has an outwardly extending portion thereof abutting against the floor.

In another of its aspects the invention relates to a furniture construction as has been hereinbefore described wherein the bracket is attached to a supporting bar and a screw is positioned in a slot in the bar between the bar and the bracket, and wherein the screw threadably engages a bottom portion of the connector structure whereby the means of attachment of the bracket to the connector structure is substantially hidden from obvious view.

In another of its aspects, the invention relates to a bracket for supporting cantilevered furniture and/or stabilizing free standing walls comprising a pair of parallel plates each having two mutually perpendicular edges, the plates are rigidly affixed to each other through internal supports, and a removal support fastening member is attached at one of the mutually perpendicular edges to affix the bracket to vertical support members, the bracket and the attaching means being so constructed that the bracket is easily affixed to the vertical support members and the means by which the bracket is attached to the vertical support member is substantially hidden from view.

In another of its aspects, the invention relates to a cantilevered desk comprising a desk top member, a pair of vertical support members, a bracket supporting the desk top member, and a clip attached to the bracket, the clip having support engaging means for hanging the bracket on the vertical support members.

In co-pending Ser. No. 623,878, filed Mar. 17, 1967 entitled Panel Joint now U.S. Pat. No. 3,430,997 there is disclosed and claimed a furniture construction in which a plurality of vertically disposed space divider components are locked together through joints wherein each joint is provided with clips for supporting a plurality of wall hung components such as desks, cabinets, and shelves. Each of the joints rigidly attaches the adjacent divider components to each other. When there are sufficient curves and corners to the system it will be self-supporting even when heavy units are hung on the component supporting clips. However, when the divider system is relatively straight, it is desirable to balance the moment of the hanging units.

We have now discovered a bracket which can be used for stabilizing the hanging wall units or can be employed to support wall hung components. The bracket has means for conveniently fastening the bracket to a vertical support member and is so constructed that the fastening means is substantially hidden from view. When used as stabilizer means, the bracket has a floor contacting member. When used as a wall unit support, the bracket has an accessory engaging means.

By various aspects of this invention one or more of the following, or other, objects can be obtained.

It is an object of this invention to provide a moveable space divider component system having hanging wall units wherein the system is self-supporting and balanced without the use of a curved wall section.

It is a further object of this invention to provide a supporting means for a space divider component system having wall units hanging therefrom wherein the stabilizer means are free from externally appearing connections.

It is a further object of this invention to provide bracket members for supporting cantilevered furniture components wherein a means for attaching the bracket to the furniture and the support are substantially hidden from view.

It is yet another object of this invention to provide a bracket which can be employed to support cantilevered furniture such as desks and the like and is adaptable to stabilize free standing space divider component systems.

Other aspects, objects, and the several advantages of this invention are apparent to one skilled in the art from a study of this disclosure, the drawings, and the appended claims.

According to the invention there is provided a bracket support member useful in stabilizing free standing wall units and for supporting cantilevered furniture members such as desks and shelves. The bracket comprises a pair of parallel plates, each having a pair of mutually perpendicular edges which are aligned in parallel relationship with corresponding edges in each plate. Means are provided for rigidly attaching the plates to each other such that the attaching means are internal of the plates and are spaced from at least one of the mutually perpendicular edges. An attaching flange is disposed between the plates and along the one of the mutually perpendicular edges. The other mutually perpendicular edge has an attaching plate and a support member fastening means attached thereto. The support member attaching means can be affixed to vertical support members.

Further, according to the invention there is provided a furniture construction comprising a plurality of free standing vertically disposed space divider components rigidly connected by a joint structure which is adapted to support wall hanging units. The construction is stabilized by a bracket member attached to the joint structure and having an outwardly extending portion thereof resting upon the floor. The bracket has a supporting bar member attached thereto, the supporting bar having a slot between the bracket and the bar containing the head of a screw. The bar is attached to the base of the joint structure through the screw. Preferably the screw has radially extending holes to permit the turning of the screw member to attach the bar to the base of the joint structure.

Still further according to the invention, there is provided a cantilevered desk in which a pair of vertical channel support members are employed for supporting a desk. The desk has a bracket support which engages the bottom portion of the desk top and has a clip attached thereto for engaging portions of the vertical channel support members.

The invention will be described with reference to the accompanying drawings in which:

FIG. 1 is a front elevational view of a furniture construction showing a first embodiment of the invention;

FIG. 2 is a top plan sectional view taken along lines II—II of FIG. 1;

FIG. 3 is a perspective exploded view showing the construction of the stabilizer means;

FIG. 4 is a sectional view taken along lines IV—IV of FIG. 1;

FIG. 5 is a sectional view taken along lines V—V of FIG. 4;

FIG. 6 is a sectional view taken along lines VI—VI of FIG. 4;

FIG. 7 is a side elevational view, partly in section, showing a second embodiment of the invention;

FIG. 8 is an exploded view of some of the components of the construction shown in FIG. 7;

FIG. 9 is a side elevational view, partly in section, of a modified form of the second embodiment shown in FIG. 7;

FIG. 10 is a sectional view through lines X—X of FIG. 9.

Referring now to the FIGS. 1-6, there is illustrated a pair of space divider panels 10a and 10b having edges 11a and 11b respectively. Each of the edges 11a and 11b has a channel-like member 12a and 12b respectively, fixed thereto by conventional means such as screws or the like. Each of the channel-like members 12 has a base 13 and upstanding flanges 14 to form a cannular recess along the entire vertical length of each of the panel edges.

The panel joint structure comprises a pair of upper wedge blocks 30 and lower wedge bloks 32 affixed to the sides of each of the panels 10a and 10b within the cannular recess 12. The upper wedge blocks 30 have upwardly inclined wedging surfaces and the lower wedge blocks 32 have downwardly inclined wedging surfaces. The panels are locked together through a connector assembly comprising lower wedging draw block 36, an upper wedging draw block 34 drawn together through an elongated tie rod or bar 41. The lower wedging draw block 36 has upwardly directed generally V-shaped wedging surfaces which are adapted to receive the lower wedging surfaces of the lower wedge block 32. The upper wedging draw block 34 has downwardly directed generally V-shaped wedging surfaces which are adapted to receive the upper wedging surfaces of the upper wedged blocks 30. The tie rod or bar 41 which connects the lower and upper wedging draw blocks has a threaded end to allow the draw blocks to be moved towards or away from each other to permit the assembly and disassembly of adjacent wall panels.

Between wedging members 30 and 32 a hanger bracket assembly is provided. The hanger bracket assembly, generally indicated by reference numeral 20, is positioned within the cannular recess 12 on each edge of the panels or other components forming part of the system. The hanger bracket assembly 20 can be affixed to the panel by any conventional means such as screws. The assembly has forward inclined surface 21 and a rear inclined surface 22. The surfaces initiate longitudinally adjacent the interior basis of flanges 14 and converge toward one another away from the panel edge as shown best in FIG. 2. The hanger bracket assembly 20 is completed by two forward connecting members 24, two rearwardly extending members 25 and a connecting web 29.

Each of the forward inclined surfaces 21 and the rear inclined surfaces 22 contain a plurality of slots 26 for supporting clips 28. The clips are insertable into the slots after the structure has been assembled. The joint structure per se has been described more fully in said co-pending Ser. No. 623,878, which is incorporated herein by reference. The description of the joint is only for purposes of environment for the bracket as the joint structure per se is claimed in said co-pending Ser. No. 623,878.

The clips 28 support hanging wall units such as shelves, cabinets, and the like. When the panels form a relatively straight wall or an extended portion of a wall, it is desirable to counterbalance the moment produced on the wall structure by the hanging wall units. According to one embodiment of the invention, the force of the wall units is counterbalanced by a bracket generally indicated by numeral 40, which bracket structure is rigidly attached to an upwardly extending portion 42 to the joint structure and abuts against the floor at outwardly extending foot 44.

The bracket structure comprises an attachment bar 46 which is L-shaped in configuration. The attachment bar 46 is attached to the bracket member 40 through a plurality of self-tapping screws 48 which engage flange 49 and through a screw 50 which is attached to plate 52 at the lower leg portion thereof. The attachment bar has a recessed portion 54 into which the head of screw 56 fits. The screw is threaded and threadably engages a threaded hole 68 in draw blocks 36. The head of screw 56 contains a plurality of radially spaced holes 60 by which holes the screw can be turned after the attachment bar 46 has been attached to the bracket member 40. In this manner, the attaching means for the bracket to the joint structure is hidden from obvious view.

Adjacent the outer end of the leg 44 of the bracket there is provided a foot 62 which is threadable into a plate 63 to support the bracket structure. With the other supporting feet 64 which are attached to the panels, a rigid triangular shaped base is provided. As can be seen in FIG. 4, the foot is adjustable relative to leg 44 so as to adjust the supporting force of the bracket on the wall.

The stabilizing bracket can be employed to counterbalance the moment on the wall created by hanging wall units as has been described. However, since the connections are rigid, it is not necessary to place the stabilizing bracket directly below the hanging wall units. In other words, the stabilizing bracket can be spaced along the wall from the hanging units if this is more practical.

The construction of the supporting bracket permits rapid addition of the support after the free standing walls have been erected and as necessary. In other words, the walls can be used in one environment without the brackets. When the wall hanging units are attached to the wall, the supporting brackets can be easily installed.

Whereas this embodiment of the invention has been described with reference to a particular environment, it is obvious that the invention can be employed with any free standing wall structure containing a vertical slot and an attaching block in the base of the walls within the slot.

The bracket support according to the invention generally comprises a pair of parallel plates having a pair of mutually perpendicular surfaces 53 and 55. In each plate, the mutually perpendicular surfaces 53 and 55 are aligned parallel to each other. Opposite the mutually perpendicular surfaces, each plate has an inturned flange at 57 forming a narrow channel between the plates. The plates are rigidly attached together through internal fastening means comprising a longitudinal U-shaped flange 45 (FIGS. 4 and 5) which is spot welded to the plates through the upstanding side flanges. The U-shaped flange is spaced from edge 43 thereby leaving that edge open. Along the edge 55 the plates are turned inwardly at 43 providing a narrow channel therebetween. A second U-shaped flange 49 is positioned between the two plates adjacent the flanges 43 and is attached at either side to the parallel plates, preferably through spot welds.

A third U-shaped flange 41 is positioned angularly with relation to both edges 53 and 55 and can be spot welded to each plate through the side flanges of the U-shaped member 41.

The three U-shaped flanges rigidly attach the plates together internally and strengthen the bracket in the areas of highest stress.

A pair of plates across the surface 53 have threaded holes for support engaging components.

Referring now to FIGS. 7 and 8, the bracket is employed in supporting a desk top 70 and 74. The second U-shaped member 49 is attached through a plurality of screws 48 to a bracket clip 80. The bracket unit is supported through downwardly extending hooks 84 of the bracket clip 80, which hooks 84 engage slots 26 in the vertical support member. A pair of brackets, each attached to a vertical support member, are used in supporting the desk top. For purposes of simplicity, only one such bracket and supporting bracket unit has been shown.

The vertical support member can be part of a relocatable wall system as disclosed with relation to the embodiment shown in FIGS. 1 through 6 or can be used with a permanent wall supported vertical channel or with a free standing vertical channel. If the vertical support members are attached to the wall, screws can be used to affix the support members to the wall. For free standing units and the relocatable wall systems, a bracket such as that shown in the first embodiment of the invention can be employed to stabilize the vertical support members.

Thus, with a simple change of attaching members (bracket clip 80 or attachment bar 46) and support engaging components (screws 76, 78 or screw 50 and foot 62), the bracket unit can be employed for stabilizing free standing vertical support members or can be employed for supporting wall hung units such as desk tops.

Referring now to FIGS. 9 and 10, the structure is shown for attaching wall hung units such as desk tops to the bracket. A spline 88 is provided with a hook 90 and attached to the bottom surface of desk top 70. The spline 88 is positioned within the open edge of the bracket formed by edges 53 and U-shaped member 45. The hook 90 is positioned beneath plate 52 and the other end of the spline is adjacent plate 63. The same bracket clip 80 can be used to affix the bracket and desk top to the vertical support members. The desk is easily positioned on the bracket by sliding hook 90 beneath plate 52 while holding up the other end of the desk. The back portion of the spline can then be dropped into the open edge of the bracket behind plate 63.

After the attachment of the bracket clip or attachment bar to the bracket, a molding 86 (FIGS. 5 and 6) can be placed in the slot in the outer surface of the bracket formed by the inwardly directed flanges of each parallel plate. The molding 86 can be rubber or plastic and shaped so as to fit snugly and securely within the slot. Whereas the second embodiment of the invention has been described with reference to a bracket having a longitudinal open edge, it is within the scope of the invention to partially close the open edge in the central portion thereof to provide two open slots, one for hook 90 and one for a rear stop member such as the outer portion of spline 88.

Reasonable variation and modification are possible within the scope of the foregoing disclosure, the drawings, and the appended claims without departing from the spirit thereof.

I claim:

1. A cantilevered desk top comprising:
 a pair of channel support members in spaced relationship to each other, each of said channel support members having side walls and an open front;
 stabilizing means for said vertical channel support members;
 at least one hanger strip secured in each of said vertical channel support members, said hanger strip having a plurality of vertically disposed slots and disposed at an acute angle to the plane between said vertical channel support members;
 a pair of bracket supports for said desk top, each of said bracket supports comprising a pair of triangularly shaped plates spaced from each other and forming an upwardly opening channel, means closing an inner end of the said channel, and a stop member closing a rear portion of said channel;
 a clip attached to said bracket support, said clip having hanger slot engaging means for engaging said hanger strip slots, one of said bracket supports being in each of said vertical channel support members engaging a hanger strip therein through said clips;
 a desk top having spaced depending splines on the underside thereof, each of said splines being positioned in a channel in one of said brackets, said splines having a forward hook portion beneath said closing means and a rear portion abutting said stop member, whereby said desk can be firmly and finally positioned on said brackets by raising the outer end of said desk, inserting said forward hook portions beneath said closing means and lowering the outer end of said desk into contact with said brackets.

2. A cantilevered desk top according to claim 1 wherein said vertical channels are attached to permanent walls.

3. A cantilevered desk top according to claim 1 wherein said vertical channels are attached to wall panels, and said stabilizer means comprises a bracket member which has a channel engaging member and a floor contacting member spaced outwardly from said channel engaging member.

References Cited

UNITED STATES PATENTS

| | | | |
|---|---|---|---|
| 2,622,834 | 12/1952 | Sparring | 108—108UX |
| 2,790,559 | 4/1957 | Stephenson et al. | 211—136 |
| 2,971,805 | 2/1961 | Weiss | 312—108 |
| 3,044,632 | 7/1962 | Schild | 108—108X |
| 3,088,424 | 5/1963 | Knuth | 108—108 |
| 3,207,100 | 9/1965 | Peacock | 108—108X |
| 3,220,363 | 11/1965 | Gingher | 108—144 |

JAMES T. McCALL, Primary Examiner

U.S. Cl. X.R.

108—108